United States Patent
Choudhari et al.

(10) Patent No.: US 11,301,619 B2
(45) Date of Patent: Apr. 12, 2022

(54) SYSTEM AND METHOD FOR TRANSFORMING A CONTRACT INTO A DIGITAL CONTRACT

(71) Applicant: Zensar Technologies Limited, Pune (IN)

(72) Inventors: Sudeep Choudhari, Pune (IN); Pvs Chanakya Yadav, Pune (IN); Prem Manoj Mehta, Pune (IN); Aditi Yaduvanshi, Pune (IN); Shreshtha Mitra, Pune (IN)

(73) Assignee: ZENSAR TECHNOLOGIES LIMITED, Pune (IN)

( * ) Notice: Subject to any disclaimer, the term of this patent is extended or adjusted under 35 U.S.C. 154(b) by 0 days.

(21) Appl. No.: 17/201,119

(22) Filed: Mar. 15, 2021

(65) Prior Publication Data
US 2021/0286936 A1    Sep. 16, 2021

(30) Foreign Application Priority Data
Mar. 13, 2020   (IN) ............................. 202021010885

(51) Int. Cl.
*G06F 16/23* (2019.01)
*G06F 40/166* (2020.01)
(Continued)

(52) U.S. Cl.
CPC .......... *G06F 40/166* (2020.01); *G06F 40/151* (2020.01); *G06F 40/211* (2020.01);
(Continued)

(58) Field of Classification Search
CPC .... G06F 40/166; G06F 40/151; G06F 40/211; G06F 40/30; G06F 40/154; G06F 40/268; G06F 40/289; G06Q 10/10; G06Q 50/18
See application file for complete search history.

(56) References Cited

U.S. PATENT DOCUMENTS

2017/0287090 A1* 10/2017 Hunn ................... H04L 9/0643
2018/0315141 A1* 11/2018 Hunn ....................... G06F 16/93
(Continued)

FOREIGN PATENT DOCUMENTS

EP        3257191 B1    4/2018

OTHER PUBLICATIONS

Monish Darda "What Are Smart Contracts?" published May 4, 2018 (5 pages).
(Continued)

*Primary Examiner* — Hassan Mrabi
(74) *Attorney, Agent, or Firm* — Shumaker, Loop & Kendrick, LLP (57) ABSTRACT

A system and a method for transforming a contract into a digital contract for deployment over a decentralized platform. The system uses blockchain and artificial intelligence to automatically execute contracts. The system is configured to capture the intent, milestones and events of a contract in smart contract codes. In order to achieve this without any imposing transition costs on users, natural language processing is utilized to draft contract and the system generates the same contract in a pre-defined standardized form. The contract in standardized form is converted to respective parse tree and abstract syntax tree. The abstract syntax tree is converted to digital contract. The digital contract is compiled and deployed on to a blockchain network.

10 Claims, 5 Drawing Sheets

(51) Int. Cl.
  *G06Q 50/18*   (2012.01)
  *G06F 40/151*   (2020.01)
  *G06F 40/211*   (2020.01)
  *G06F 40/30*   (2020.01)
  *G06Q 10/10*   (2012.01)

(52) U.S. Cl.
  CPC ............. *G06F 40/30* (2020.01); *G06Q 10/10* (2013.01); *G06Q 50/18* (2013.01)

(56) References Cited

U.S. PATENT DOCUMENTS

2018/0365201 A1* 12/2018 Hunn .................... H04L 9/3239
2020/0104296 A1* 4/2020 Hunn .................. G06F 16/2379
2021/0342836 A1* 11/2021 Celia ...................... G06Q 50/01

OTHER PUBLICATIONS

Accenture "Blockchain for contracts" (9 pages total) accessed on Mar. 12, 2021; https://www.accenture.com/hu-en/case-studies/about/blockchain-contracts-harnessing-new-technology.

* cited by examiner

SYSTEM AND METHOD FOR TRANSFORMING A CONTRACT INTO A DIGITAL CONTRACT

CROSS-REFERENCE TO RELATED APPLICATIONS AND PRIORITY

The present application does claim priority from Indian Patent application number 202021010885 filed on 13 Mar. 2020.

TECHNICAL FIELD

The present subject matter described herein, in general, relates to the field of contract management. More particularly, the present invention relates to a system and method for transforming a contract into a digital contract.

BACKGROUND

With the increase in trade across the globe, contract drafting and execution has gained significant importance. Conventionally, contracts are dratted on paper and maintained in the from of hard copy or in come cases, in the form if an electronic document. The conventional process of Agreement execution is carried out on plain paper which requires manual writing, a lawyer or a legal representative to validate/authenticate all the legal clauses of the entire agreement whenever a condition is fulfilled. This manual process is quite wearisome, tedious, error-prone and time-consuming.

Existing digital technologies in contract management system work in silos i.e. drafting, negotiations (considerations) and execution of contract are not coordinated. Even with cloud systems, current contract management systems don't have underling network of two independent parties interacting/transacting with each other. There is always a third party involved mitigating connecting the parties and executing the contracts with highly unreliable and insecure central databases.

The three necessary aspects of an aspiring contract management system are intent capture, milestone driven clauses and event driven clauses. However, current contract management systems do not have the ability to execute event driven clauses without human intervention.

Blockchain based contract management system will be a manifold improvement over existing technologies as smart contracts of blockchain allow for self-executing contracts that their own performance, triggering clauses based on external events at client-side, regularly listening to current state of the contract and keeping track of milestones of the contract along the way.

There are some blockchain based technologies trying to execute contracts on blockchain. Such platforms like. Open Law, Accord Project allows users to create templates and embeds machine executable expressions in the templates. Contract Management firms like Icertis™ use blockchain to store agreements and doesn't execute contract; on blockchain directly. They use blockchain only for tracking the agreement, in certain blockchain based contract executing systems, clauses are matched and mapping to respective smart contract codes to execute contracts. Other initiatives like Lexon Foundation are using a transpilers to convert agreements in human readable syntaxial languages to language deployable on blockchain albeit without any flexibility in drafting using tools like NLP.

Thus, there is a long-standing need of a system and method which converts plain text agreements with all three: intent driven, milestone driven and event driven clauses into an equivalent self executable and deployable smart contract.

SUMMARY

This summary is provided to introduce the concepts related to a system and method for transforming a contract into a digital contract for deployment over a decentralized platform and the concepts are further described in the detail description. This summary is not intended to identify essential features of the claimed subject matter nor it is intended to use in determining or limiting the scope of claimed subject matter.

In one embodiment, the present subject matter describes method for transforming a contract into a digital contract for deployment over a decentralized platform. The method comprises processor implemented steps for receiving data from a user device, wherein the data corresponds to a set of clauses of a contract to be signed between two or more entities. The method further comprises processor implemented steps applying Natural Language Processing (NLP) on the data to transform the set of clauses into as standardized format. The method further comprises processor implemented steps parsing each clause from the set of clauses to generate a parse tree corresponding to each clause from the set of clauses. The method further comprises processor implemented steps processing each parse tree, corresponding to each clause, to generate a set of abstract syntax trees, wherein at least one abstract syntax tree is linked with at least one department, of at least one entity from the two or more entities. The method further comprises processor implemented steps for generating a digital contract from the set of abstract syntax trees using a transpiler. The method further comprises processor implemented steps for deploying the digital contract on a decentralized platform, wherein the decentralized platform is linked with the two or more entities.

In one implementation, the present subject matter describes a system for transforming a contract into a digital contract for deployment over a decentralized platform. The system comprises a processor and a memory coupled with the processor, wherein the processor is configured to execute a plurality of programmed instructions stored in the memory. The processor is configured for receiving data from a user device, wherein the data corresponds to a set of clauses of a contract to be signed between two or more entities. The processor is further configured for applying Natural Language Processing (NLP) on the data to transform the set of clauses into a standardized format. The processor is further configured for parsing each clause from the set of clauses to generate a parse tree corresponding to each clause from the set of clauses. The processor is further configured for processing each parse tree, corresponding to each clause, to generate a set of abstract syntax trees, wherein at least one abstract syntax tree is linked with at least one department, of at least one entity from the two or more entities. The processor is further configured for generating a digital contract from the set of abstract syntax trees using a transpiler. The processor is further configured for deploying the digital contract on a decentralized platform, wherein the decentralized platform is linked with the two or more entities.

BRIEF DESCRIPTION OF DRAWINGS

The detailed description is described with reference to the accompanying figures.

DETAILED DESCRIPTION

Reference throughout: the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in an suitable manner in one or more embodiments.

Figure 1:
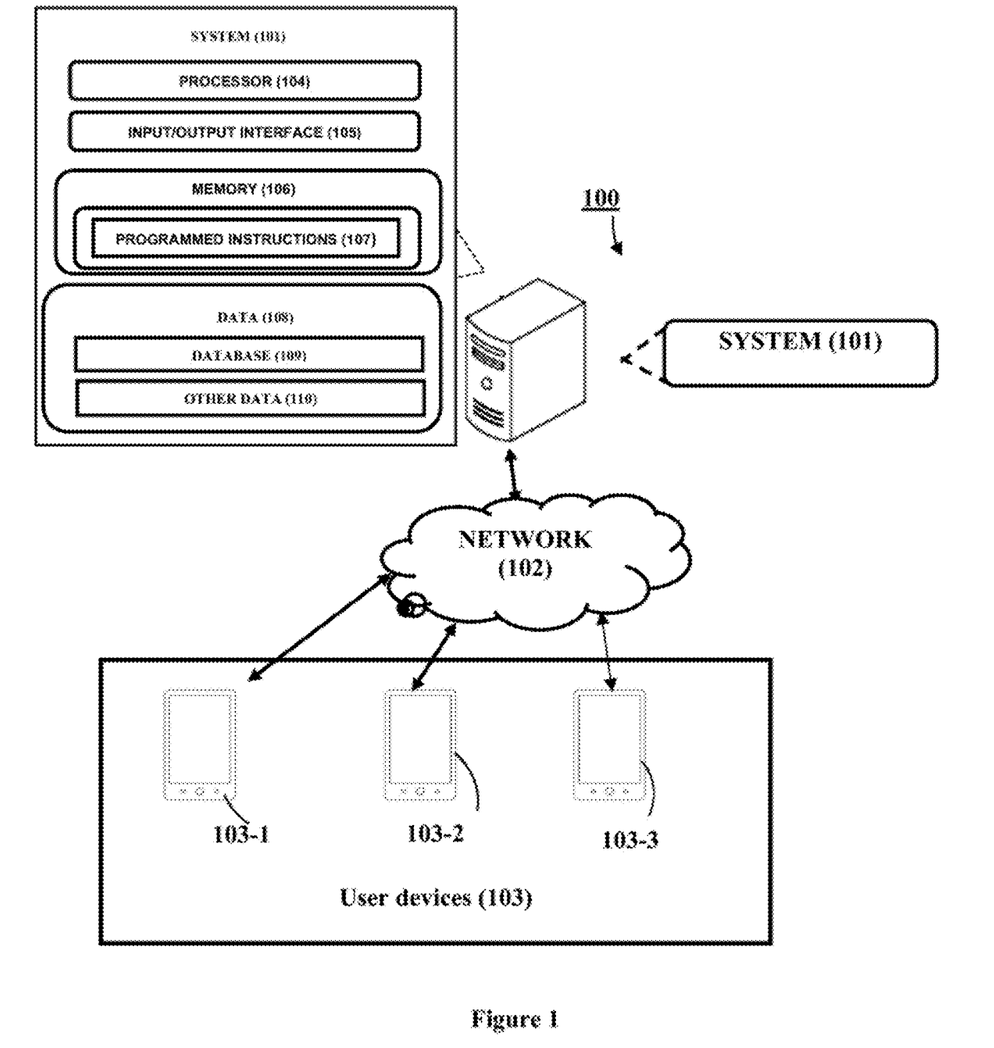
FIG. 1 illustrates an implementation 100 of a system 101 for transforming a contract into a digital contract for deployment over a decentralized platform, in accordance with an embodiment of a present subject matter.

Exiting technology in a contract management system works in silos (i.e. drafting, negotiations (considerations) and execution of contract are not coordinated). Even with cloud systems, current contract management systems don't have underling network of two independent parties interacting/transacting with each other. There is always a third party involved mitigating connecting the parties and executing the contracts with highly unreliable and insecure central databases. To address this problem a system (101) for transforming a contract into a digital contract for deployment over a decentralized platform is illustrated in FIG. 1. In accordance with aspects of the present subject matter, the system (101) enables conversion of a legal agreement into self-executable contract on a decentralized platform without interference of any other entity. The users may also track the performance and trigger a clause with mutual consent.

In one embodiment, the system (101) may be connected to a user device (103) over a network (102), it may be understood that the system (101) may be accessed by multiple users through one or more user devices (103-1), (103-2), (103-3) . . . (103-n), collectively referred to as the user device (103) hereinafter, or user (103), or applications residing on the user device (103). The user (103) may be any person, machine, software, automated computer program, a robot or a combination thereof.

In an embodiment, the present subject matter is explained considering that the system (101) may be implemented in a variety of user devices, including but not limited to, server, a portable computer, a personal digital assistant, a handheld device, a mobile, a laptop computer, a desktop computer, a notebook, a workstation, a mainframe computer, and the like. In one embodiment, the system (101) may be implemented in a cloud-computing environment, in an embodiment, the network (102) may be a wireless network such as Bluetooth, Wi-Fi, LTE and such like, a wired network or a combination thereof. The network (102) can be accessed by the user device (103) using wired or wireless network connectivity means including updated communications technology.

In one embodiment, the network (102) can be implemented as one of the different types of networks, cellular communication network, Local Area Network (LAN), Wide Area Network (WAN), the interact, and the like. The network (102) may either be a dedicated network or a shared network. The shared network represents an association of the different types of networks that use a variety of protocols, for example. Hypertext Transfer Protocol (HTTP). Transmission Control Protocol/Internet Protocol (TCP/IP), Wireless Application Protocol (WAP), and the like, to communicate with one another. Further, the network (102) may include a variety of network devices, including routers, bridges, servers, computing devices, storage devices, and the like.

The system (101) may include at least one processor (104), an input/output (I/O) interface (105), a memory (106), programmed instructions (107) and data (108). In one embodiment, the at least one processor (104) may be configured to fetch and execute computer-readable/programmed instructions (107) stored in the memory (106).

In one embodiment, the I/O interface (105) may be implemented as a mobile application or a web-based application and may further include a variety of software and hardware interfaces, for example, a web interface, a graphical user interface, image capturing means of the user device and the like. The I/O interface (105) may allow the system (101) to interact with the user devices (103). Further, the interface (105) may enable the user device (103) to communicate with other computing devices, such as web servers and external data servers (not shown). The I/O interface (105) can facilitate multiple communications within a wide variety of networks and protocol types, including wired networks, for example, LAN, cable, etc., and wireless networks, such as WLAN, cellular, or satellite. The I/O interface (105) may include one or more ports for connecting to another server.

In au implementation, the memory (106) may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and memory cards. The memory (106) may include programmed instructions (107) and data (108).

In one embodiment, the data (108) may comprise a database (109), and other data (110). The other data (110), amongst other things, serves as a repository for storing data processed, received, and generated by the one or more of the programmed instructions (107).

The aforementioned computing devices may support communication over one or more types of networks in accordance with the described embodiments. For example, some computing devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, N AMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. Computing devices and networks also may support wireless wide area network (WWAN) communications services including Internet access such as EV-DO, EV-DV CDMA/1xRTT, GSM/GPRS, EDGE, HSDPA, HSUPA and others.

The aforementioned computing devices and networks may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.2x ("Mobile-Fi") and others, Computing devices and networks also may support short range communication such as a wireless personal area network (WPAN) communication, Bluetooth® data communication, infrared (IR) communication, near-field communication, electromagnetic induction (EMI) communication, passive or active REID communication, micro-impulse radar (MIR), ultra-wide band (UWB) communication, automatic identification and data capture (AIDC) communication, and others.

In one embodiment, a contract management system enabled over a decentralized platform such as block chain is enabled a self-executable contracts (smart contracts) to address the problems in conventional process of agreement execution such as third-party interventions, working in silos, non-compliance of parties, and the like.

However, in order to convert a legal agreement contract into a smart contract executable over a distributed system requires specific development skills, such as blockchain specific computer programming skillset. The objective of the present invention is to streamline the entire procedure which involves the conversion of plain text contract clauses into the smart contract and final automated execution of the contract.

In one embodiment, the contractual clauses of an agreement contract may be executed on a blockchain platform. Blockchain platforms like Ethereum, quorum, and the like empowers users with the power to codify their contractual clauses enabling self-execution of contracts. The immutable and distributed nature of ledgers in blockchain allows for transparent performance tracking and existence of single source truth for the parties involved in a contract agreement. Codification of the contractual clauses on blockchain enables the parties to transact and interact with each other within the realm of a contract code and in a decentralized manner (i.e., without involvement or dissemination of information to a third party). The contract code, commonly referred as smart contract, is written for blockchain execution and respond only to the commands codified in a smart contract code. Thereby enabling the parties to create their own custom APIs for interacting with their respective accountable functions in a smart contract code. Therefore, any peer-peer interaction may be achieved in its truest sense without the need of any intermediary.

The distributed blockchain platform (e.g., Ethereum, Quorum etc.) enables the Legal Representatives to codify the Plain-Text Agreement Clauses into Smart Contracts which are automatically executed soon after an event outlined in the contract is triggered. Blockchain's Decentralization nature helps in diminishing any Central or third-party interference and enables the involved users to transact and communicate within the Platform which prevents tampering or alteration of Contract clauses. Blockchain's Immutability and Distributive nature helps in maintaining Data Visibility and Contract Transparency and Consensus Property enables the existence of single source truth for the Users involved in the Contract/Agreement which makes the entire system more secure and reliable. The blockchain enables the interacting to create their own custom APIs for interacting with their respective accountable functions in the Smart Contract's solidity code. Conversion of plain-text agreement to Markup Language via NLP Engine eliminates the necessity of learning Programming Language (Solidity) for creating smart contracts. NLP Engine makes the entire agreement drafting process easier as it continuously learns the nuances and semantics of different Legal Agreements and suggests the most relevant statements to the intended user to make the agreement more relatable and accurate.

Figure 2:
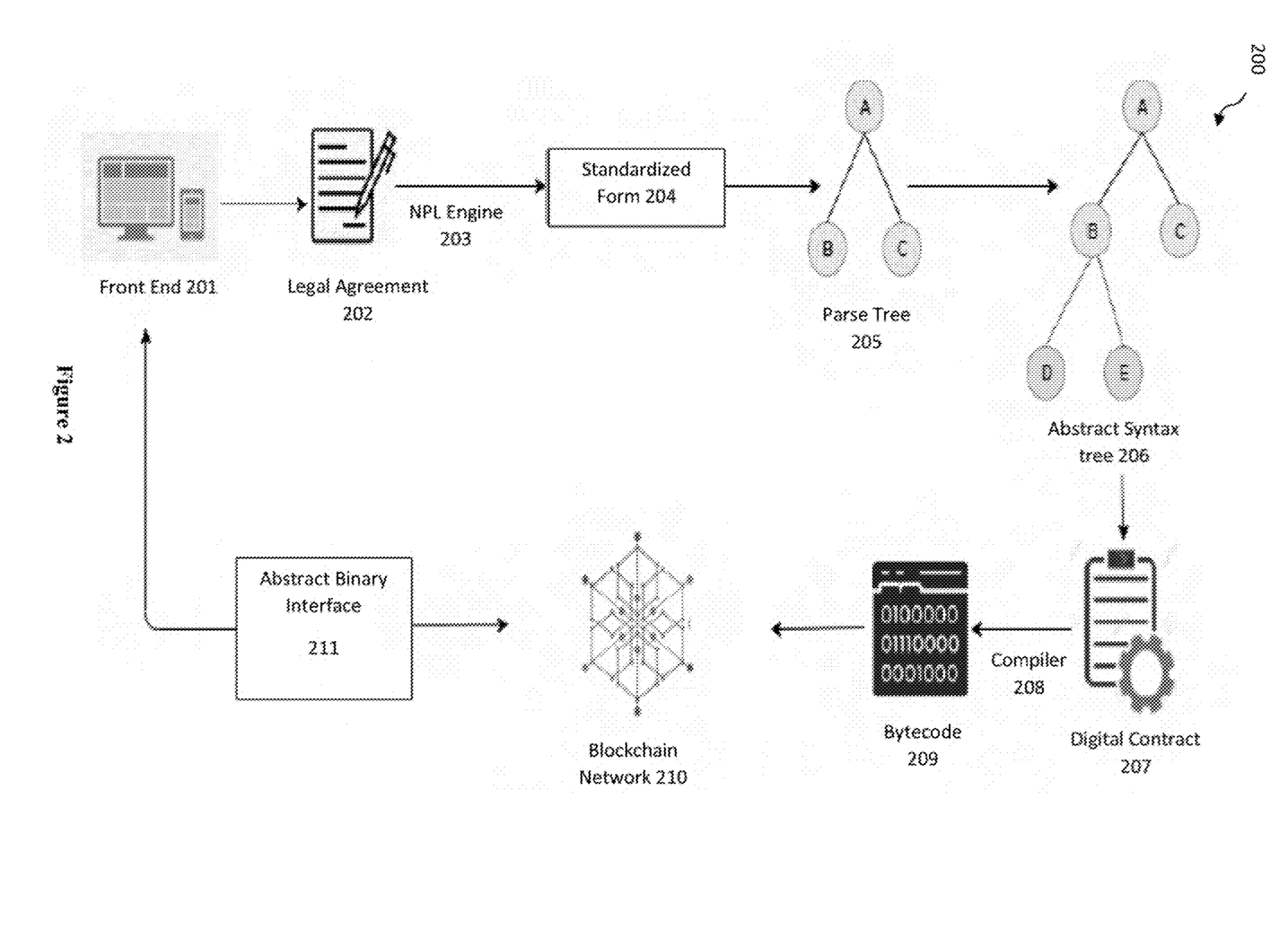
FIG. 2 illustrates an architecture 200 of the system 101 deployed on a blockchain, in accordance with an embodiment of a present subject matter.

Referring to FIG. 2, an architecture (200) of the system (101) deployed on a blockchain is illustrated, in accordance with an embodiment of a present subject matter. In one embodiment, contract management system which is executed on Blockchain peer to peer network. The parties between whom the contract is to be made are part of a Blockchain network. Unlike traditional contracts which is written on a piece of paper or soft document, these agreements or contracts are piece of computer code which stays in the Blockchain network. These smart contracts are equivalent to the traditional written contracts as they have all the functionality and creditability which traditional contracts have. After the smart contract is written/coded, it is deployed on the Blockchain network with all the concerned parties' signature.

In one embodiment, in order to make these legal smart contracts the knowledge of smart contract programming language and legal terms is necessary. Also, to write complex and detailed smart contracts one should be expert in the programming language. The present system (101) takes away the need to learn the programming language for smart contract. The system (101) converts the plain natural language text to a machine-readable code of smart contract. The system (101) utilizes Artificial intelligence (AI) and Markdown converter sequentially to convert a plain text to machine readable smart contract language. Natural Language Processing (NLP) understands the plain text by identifying its intent. It then extracts the entities from the plain text according to the intent. After extracting intents and entities, these information goes to Markdown converter. This system converts these structured inputs into a programming language code. The conversion of direct plain text to smart contract is enabled by the system (101). The system 101 can be used in Legal domain in various agreements between different parties. It can also be used in Insurance domain for claims, supply chain management for delivery tracking and monitoring and in banking domain for loan and asset tracking.

In a preferred embodiment, the architecture (200) of the system (101) for real-time contract drafting and management deployed on a blockchain comprises a front end operating system (201), a legal agreement (202), an NPL engine (203), a standardized form (204), a parse tree (205), an abstract parser tree (206), a digital contract (207), a compiler (208), a bytecode (209), a blockchain network (also referred as blockchain) (210) and an abstract binary interface (211). In one embodiment, the system (101) is configured to receive data which corresponds to a set of clauses of a contract or a legal agreement (202), to be signed between two or more entities. In other words, one or more legal representatives may interact and draft the legal agreement (202) in human readable format from the front end operating system (201).

The system (101) is further configured to apply Natural Language Processing (NLP) on the data to transform the set of clauses into the standardized form (204). In one embodiment, the data is in the form of human readable plain text, and wherein the standardized form (204) corresponds to a pseudocode. The NLP engine (203) applies natural language processing on the data, wherein the NLP engine (203) is configured to understand the intent and semantics of the set of clauses in the legal agreement (202) and convert it into standardized form (204) which is derived from the grammar of language defined in the legal agreement (202). The Natural Language Processing (NLP) engine (203) is configured for maintaining a knowledge repository, wherein the knowledge repository is updated periodically with nuances and semantics of different legal agreements. The NLP engine (203) is further configured for self-learning an intent of each clause from the set of clauses. The NLP engine (203) is further configured for identifying the one or more entities concerning to one or more clauses and suggesting one or more corrections in the one or more clauses from the set of clauses to make the set of clauses legally complete. The NLP engine (203) is further configured for compiling each of the clause from the set of clauses into a pre-standardized form; and executing the set of clauses in a successive format in order to retain the flow of the set of clauses. In other words, the user may write the clauses in whatsoever way, the NLP engine (203) understands the intent of the clause and list out the flow of the contract in the standard firm. So, essentially the NLP engine (203) is converting complicated Text sentences into structured syntactic format which any programming language requires. Also, the standard format is still a human readable version of the contract which proves to the user that the NLP engine (203) has understood the contract correctly. The NLP engine (203) helps in consideration/ negotiation of a contract which is integral for any contract making in any jurisdiction. The NLP engine (203) eliminates need for the users to learn programming languages necessary to work on blockchain platforms. Moreover, the NLP engine (203) makes drafting of legal agreements easier as NLP can continuously learn the nuances and semantics of different legal agreements and suggest necessary changes to make the agreements legally complete.

The system (101) is further configured for parsing each clause from the set of clauses to generate a parse tree (205) corresponding to each clause from the set of clauses, in other words, the standardized form (204) may be fed into a parser and a parse tree (205) is obtained. A lexer in the parser tokenizes the content based on the grammar defined and parser stacks or groups the tokens in the order in which the actions must be performed in form of a tree. In one embodiment, the grammar of said language is defined in PEGJS (JavaScript code for parser expression grammar) format. The parser is a combination of lexer and parser that takes any text written in pre-defined grammar and produces a parse tree (205), wherein lexer tokenizes the content based on the grammar defined and parser stacks or groups the tokens in the order in which the actions must be performed in form of a tree. PEGJS parsers have no such two distinct programs but combines lexing and parsing into a single program. The parse tree (205) is just a reflection of any text written in the syntactic sequence defined in the grammar. That parse tree (205) obtained from an agreement written in standardized form (204) may be modified into abstract parser tree of a smart contract code that has same intent, milestones and events. Any language does not inherently understand whether a particular text is a number, a word, or a hexdigit. Initially it is defined what a word, what a number and another operation (like +, =, etc) are. The system (101) is configured to read character after character. Later the characters are bundled into respective words and numbers. Example: "My id is 233", "m" and "y" are bundled as a word, "2,", "3" and "3" are bundled as "233" and understood as a number. This way all characters separated by whitespaces (usually) are tokenised. When each word is tokenised, the tokens are then used to form a tree type data structure which gives relation of one token to other tokens, making sense of the whole sentence, Example: "I am chanakya". After "I", "am", and "chanakya" are tokenised. Later they are stacked to Lorna a tree such that "'I' is subject', "'am" is verb' and "'chanakya" is object'. Therefore, the tree indicates relationship between "I" and "chanakya".

The system (101) is further configured for processing each parse tree, corresponding to each clause, to generate a set of abstract syntax trees (206). Furthermore, at least one abstract syntax tree, from the set of abstract syntax trees (206), is linked with at least one department, of at least one entity from the two or more entities. In other words, after modifying each of the parse trees (205), the set of abstract syntax trees (206) are created.

The system (101) is further configured for generating, a digital contract (207) from the set of abstract parse trees (206) using a transpiler. The digital contract code may be designed to require multi-signatures from users (using their private and public keys) to deploy contract on a blockchain platform which captures the consent part of any legal agreement. Any smart contract code when deployed using its bytecode may be provided with a contract address which is necessary to further interact with the digital contract (207).

The system (101) is further configured for deploying, the digital contract (207) on a decentralized platform, wherein the decentralized platform is linked with the two or more entities. In other words the digital contract (207) is compiled and deployed onto blockchain network (210). In one embodiment, the parser tree in smart contract syntactic structure may be compiled into a machine-readable bytecode (209), via compiler (208) which may be used for deploying smart contracts on to a blockchain platform.

In one embodiment, the system (101) is further configured for monitoring the digital contract (207) in real-time to identify one or more events, wherein occurrence of the one or more events is determined based on analysis of real-time data received from at least one department of at least one entity. In one embodiment, an application binary interface (ABI) (211) of the respective smart contract code may be used to interact with the smart contract at a known contract address. Since, blockchain platforms like Ethereum have a virtual machine for executing commands of a smart contract code, the application binary interface (211) is employed to pass transactions and function callings as binary format information to those external programs. Functions in Smart contract codes may be equipped with modifiers that give permission to only select users to interact with them. Hence, the parties or entities that negotiated (consideration) and deployed the digital contract (207) with consent may use the respective ABI (211) to interact with their accountable functions. This also ties in the object, which is the certain and pre-determined subject matter of each party's obligation, into the contract. The system (101) is further configured to update, the digital contract (207), in real-time, based on the one or more events. In one embodiment, the one or more events comprise violation or compliance of one or more conditions corresponding to the set of clauses. In one embodiment, the parties or entities involved. In the contract, can choose to their own custom APIs in order to interact with the deployed smart contract to perform their duty towards the contract.

Thus, the system (101) uses blockchain and Artificial Intelligence to automatically execute contracts. The system (101) is configured to capture the intent, milestones and events of a contract in smart contract codes. In order to achieve this without any imposing transition costs on users, natural language processing is utilized to draft contract and it generates the same contract in a pre-defined standardized format. The contract in standardized format is converted to respective smart contract code using a transpiler. The smart contract may be compiled and deployed on to a blockchain platform like Ethereum.

Figure 3:
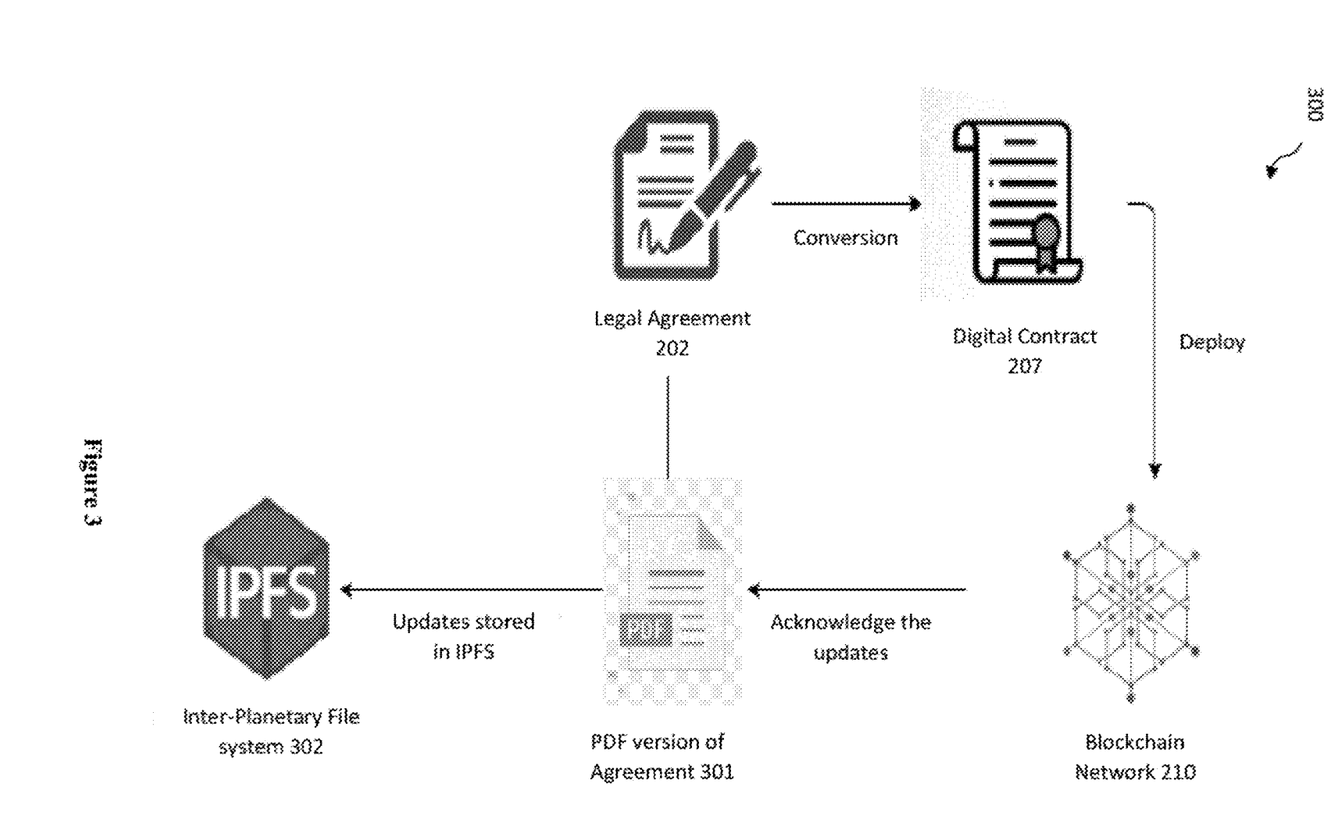
FIG. 3 illustrates updates storing components 300 of the system 101 for transforming a contract into a digital contract to deployment over a decentralized platform, in accordance with an embodiment of a present subject matter.

FIG. 3 illustrates updates storing components (300) of the system (101) for transforming a contract into a digital contract for deployment over a decentralized platform, in accordance with an embodiment of a present subject matter. In one embodiment the updates storing components (300) may comprise the legal agreement (202), the digital contract (207), the blockchain network (210), a PDF version of agreement (301), and an inter-planetary file system (302). After successful deployment of the digital contract (207) onto blockchain with the consent of all the parties who are involved in the agreement, whenever any specific condition is met which can trigger the execution of digital contract function, then all such events and logs may be stored into decentralized file transfer system like inter-planetary file system (IPFS) (302). The agreement which may be the PDF version of agreement (301), too may be stored in a decentralized file transfer server systems like IPFS (302), so that the users cannot tamper the PDF version of agreement (301) and it is available for all the parties to verify the contents using the hash obtained while storing in such decentralized server systems. In one embodiment, the plain text agreement written by any user may further be inherently linked with the digital contract (207) by storing the contract address of the digital contract in the agreement, in one embodiment, digital contract (207) may be referred as smart contract. Like the contract address of a smart contract, hash of the agreement stored in decentralized servers may also be stored in the respective smart contract.

Figure 4:
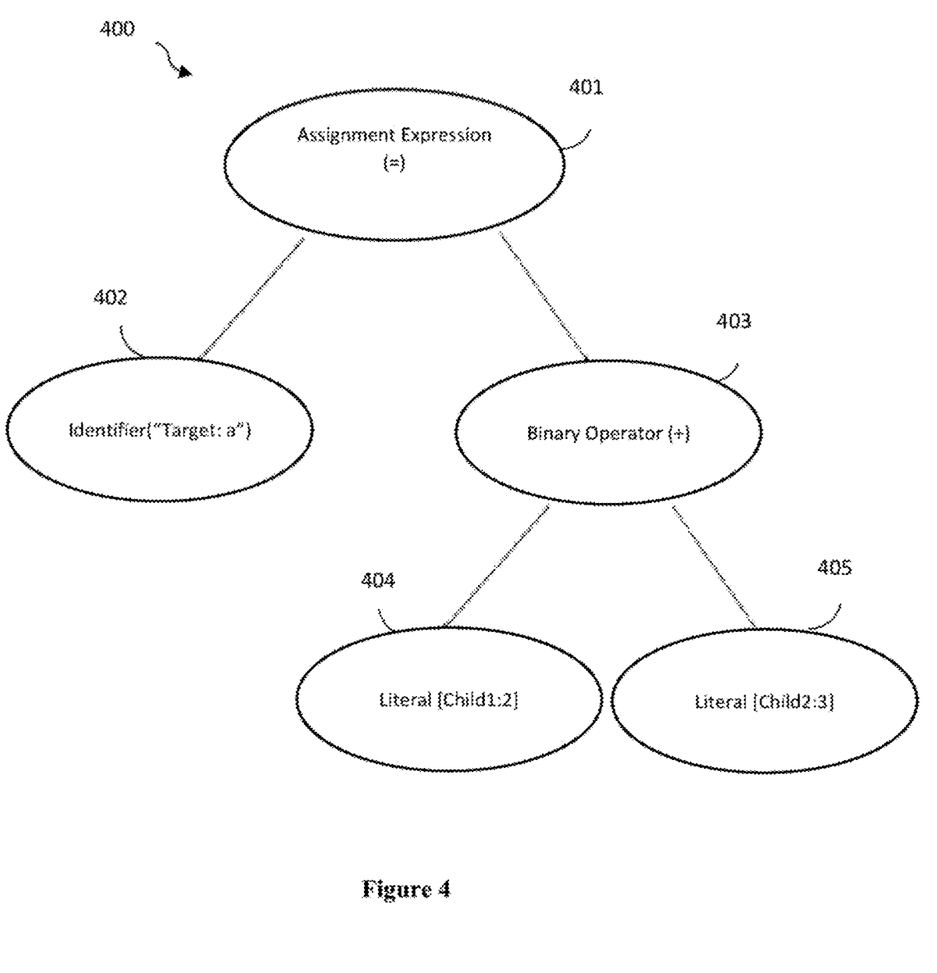
FIG. 4 illustrates a parser tree 400 of the system 101 for transforming a contract into a digital contract, in accordance with an embodiment of a present subject matter.

FIG. 4 illustrates a parser tree (400) of the system (101) for transmitting a contract into a digital contract, in accordance with an embodiment of a present subject matter. In one embodiment, in order to get a simple addition expression reflected in the digital contract (207) the parser tree (400) is generated. Considering an example $a=2+3$ The NLP engine (203) may get input sentence in many ways that may have same intent like define 'a' as sum of 2 and 3 (or) declare 'a' as sum of 2 and 3 (or) define 'a' as addition of 2 and 3 (or) any such similar sentences. Later the NLP engine (203) needs to convert any such sentence to pre-defined line format like "'a' is sum of 2 and 3". The objective is to convert above standard sentence into a parse or a syntax tree structure or simply a solidity code that is understood by a solidity compiler. The grammar of said sentence ("a is sum of 2 and 3") may be defined as Grammar=Target whitespace "is" whitespace operator whitespace "of" Child1 whitespace "and" whitespace Child2. A parser may create tokens by understanding that an input sentence ("a is sum of 2 and 3") has same grammar as defined as above. At step (401), 'is' is tokenized as assignment expression (=). At step (402), 'a' is tokenized as target. At step (403), is tokenized as a binary operator. At step (404), '2' is tokenized as Child 1 and at step (405) '3' is tokenized as Child 2. In other words, the above expression is tokenized as [Target: "a", is, operator: "sum" (+), of, Child1:2, and, Child2:3]. The parser thus creates a parser or syntax tree (400). The flow of an expression is 2 and 3 will be added and then the result will be assigned to variable "a". In one embodiment, the user may be given a choice to verify the smart contract in presence of a developer by convert the tree into solidity source code which the developers can understand. The digital or smart contract (207) may be further converted to its ABI and binary forms using well known solidity compilers.

Thus, the system (101) is transparent and trustworthy in a sense that the legal agreement is converted into a self-executable contract on blockchain directly without interference of any other entity. There is no onus on the users to learn any new language to write their own self-executable contracts. There is also no restriction or constraints in the catalogue of functionalities to choose and execute. Any human readable legal agreement can be self-executed on the blockchain. The users too can track the performance and trigger a clause with mutual consent.

Figure 5:
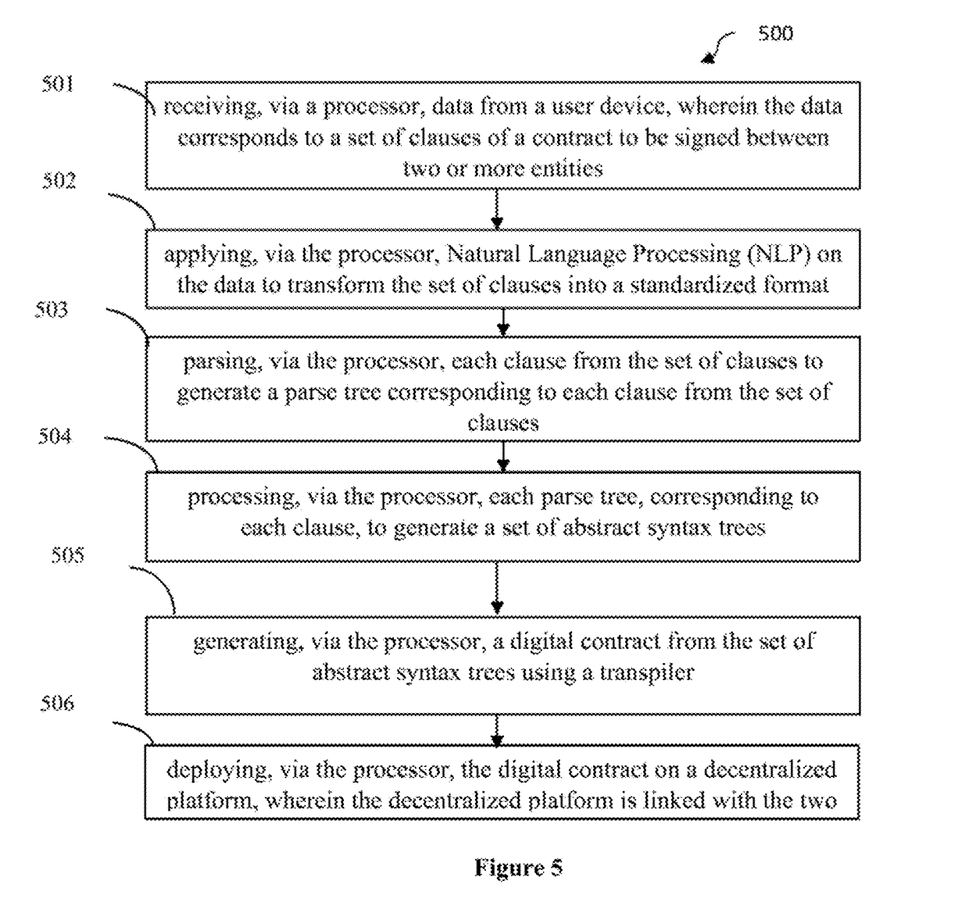
FIG. 5 illustrates a method 500 for transforming a contract into a digital contract for deployment over a decentralized platform, in accordance with the embodiment of the present subject matter.

FIG. 5 illustrates a method (500) for transforming a contract into a digital contract for deployment over a decentralized platform, in accordance with the embodiment of the present subject matter.

At step 501, the processor (104) is configured for receiving data from the user device (103), wherein the data corresponds to a set of clauses of a contract to be signed between two or more entities. For example, the contract may be signed between an OEM and its suppliers. Furthermore, the data may be received in the form of an electronic document such as word or PDF document.

At step 502, the processor (104) is configured for applying Natural Language Processing (NLP) on the data to transform the set of clauses into a standardized format. The Natural language processing may be performed by the NLP engine (203). The NLP engine (203) may be configured for maintaining a knowledge repository, wherein the knowledge repository is updated periodically with nuances and semantics of different legal agreements. The NLP engine (203) may further be configured for self-learning an intent of each clause from the set of clauses. The NLP engine (203) may further be configured for identifying one or more entities concerning to one or more clauses. The NLP engine (203) may further be configured for suggesting one or more corrections in the one or more clauses from the set of clauses to make the set of clauses legally complete. The NLP engine (203) may further be configured for compiling each of the clause from the set of clauses into a pre-standardized form. The NLP engine (203) may further be configured for executing via the processor, the set of clauses in a successive format in order to retain the flow of the set of clauses.

At step 503, the processor (104) is configured for parsing each clause from the set of clauses to generate a parse tree corresponding to each clause from the set of clauses.

At step 504, the processor (104) is configured for processing each parse tree, corresponding to each clause, to generate a set of abstract syntax trees, wherein at least one abstract syntax tree is linked with at least one department, of at least one entity from the two or more entities.

At step 505, the processor (104) is configured for generating a digital contract from the set of abstract syntax trees using a transpiler.

At step 506, the processor (104) is configured for deploying the digital contract on a decentralized platform, wherein the decentralized platform is linked with the two or more entities. The decentralised platform may be a blockchain network. It must be noted that the digital contract may be updated based on a feedback received from the user device.

In one embodiment, once the smart contract is deployed over a decentralized platform, the method may further comprise steps for monitoring the digital contract (207) in real-time to identify one or more events. The occurrence of the one or more events may be determined based on analysis of real-time data received from at least one department of at least one entity. Furthermore, the method may comprise steps for updating the digital contract (207), in real-time, based on the one or more events. The one or more clauses corresponding to the one or more events may be stored over the decentralised platform.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

Although implementations for the system (101) and method (500) for transforming a contract into a digital contract have been described in language specific to structural features and/or methods, it is to be understood that the appended claims are not necessarily limited to the specific features or methods described. Rather, the specific features and methods are disclosed as examples of implementations for the system (101) and method (500) for transforming a contract into a digital contract.

The invention claimed is:

1. A method for transforming a contract into a digital contract for deployment over a decentralized platform, the method comprising:
receiving, via a processor, data from a user device, wherein the data corresponds to a set of clauses of a contract to be signed between two or more entities;
applying, via the processor, Natural Language Processing on the data to transform the set of clauses into a standardized form;
parsing, via the processor, each clause from the set of clauses to generate a parse tree corresponding to each clause from the set of clauses;
processing, via the processor, each parse tree, corresponding to each clause, to generate a set of abstract syntax trees, wherein at least one abstract syntax tree is linked with at least one department, of at least one entity from the two or more entities;
generating, via the processor, a digital contract from the set of abstract syntax trees using a transpiler; and
deploying, via the processor, the digital contract on a decentralized platform, wherein the decentralized platform is linked with the two or more entities.

2. The method as claimed in claim 1 further comprises steps for:
monitoring, via the processor, the digital contract in real-time to identify one or more events, wherein occurrence of the one or more events is determined based on analysis of real-time data received front at least one department of at least one entity; and
updating, via the processor, the digital contract, in real-time, based on the one or more events.

3. The method as claimed in claim 1, further comprises steps for storing one or more clauses corresponding to the one or more events over the decentralised platform.

4. The method as claimed in claim 1, wherein the Natural Language Processing comprises steps of:
maintaining via the processor, a knowledge repository, wherein the knowledge repository is updated periodically with nuances and semantics of different legal agreements;
self-learning via the processor, an intent of each clause from the set of clauses;
identifying, via the processor, one or more entities concerning to one or more clauses;
suggesting via the processor, one or more corrections in the one or more clauses from the set of clauses to make the set of clauses legally complete;
compiling via the processor, each of the clause from the set of clauses into a pre-standardized form; and
executing via the processor, the set of clauses in a successive format in order to retain the flow of the set of clauses.

5. The method as claimed in claim 1, wherein the decentralised platform is a blockchain network.

6. The method as claimed in claim 1, wherein the digital contract is updated based on a feedback received from the user device.

7. A system for transforming a contract into a digital contract for deployment over a decentralized platform, the system comprising:
a processor; and
a memory coupled with the processor, wherein the processor is configured to execute a plurality of programmed instructions stored in the memory for:
receiving data from a user device, wherein the data corresponds to a set of clauses of a contract to be signed between two or more entities;
applying Natural Language Processing on the data to transform the set of clauses into a standardized form;
parsing each clause from the set of clauses to generate a parse tree corresponding to each clause from the set of clauses;
processing each parse tree corresponding to each clause, to generate a set of abstract syntax trees, wherein at least one abstract syntax tree is linked with at least one department, of at least one entity from the two or more entities;
generating, a digital contract from the set of abstract parse trees using a transpiler; and
deploying, the digital contract on a decentralized platform, wherein the decentralized platform is linked with the two or more entities.

8. The system as claimed in claim 7 further comprises steps for:
monitoring the digital contract in real-time to identify one or more events, wherein occurrence of the one or more events is determined based on analysis of real-time data received from at least one department of at least one entity; and
updating, the digital contract, in real-time, based on the one or more events.

9. The system as claimed in claim 7, wherein the standardized form corresponds to a pseudocode.

10. The system as claimed in claim 7, wherein the one or more events comprise violation or compliance of one or more conditions corresponding to the set of clauses.

* * * * *